June 24, 1958     T. R. ROEN     2,840,010
HATCH FRAME ARRANGEMENT
Filed Nov. 16, 1955     2 Sheets-Sheet 1
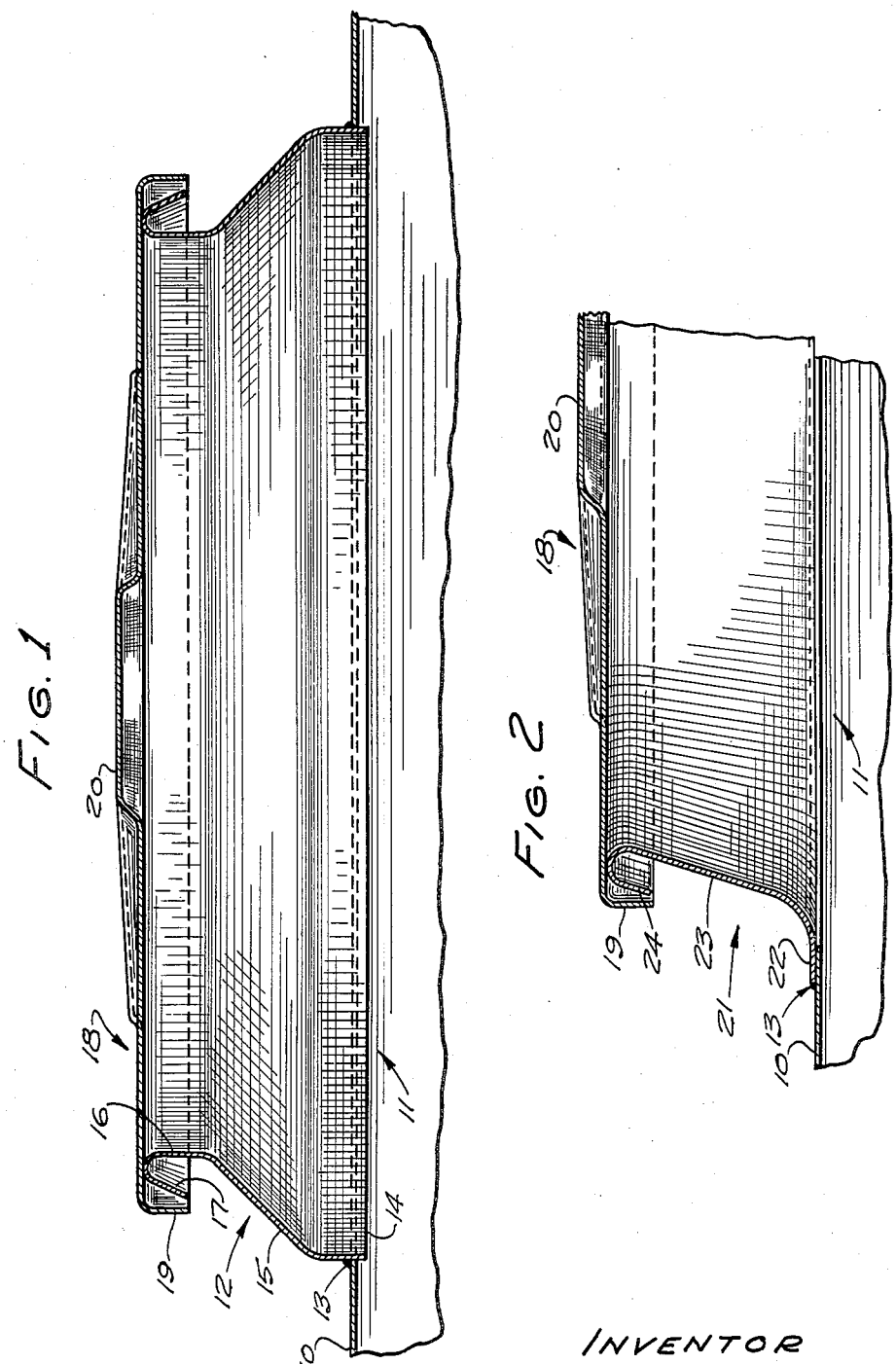
INVENTOR
THOR R. ROEN
By Wayne Morris Russell. ATTY.

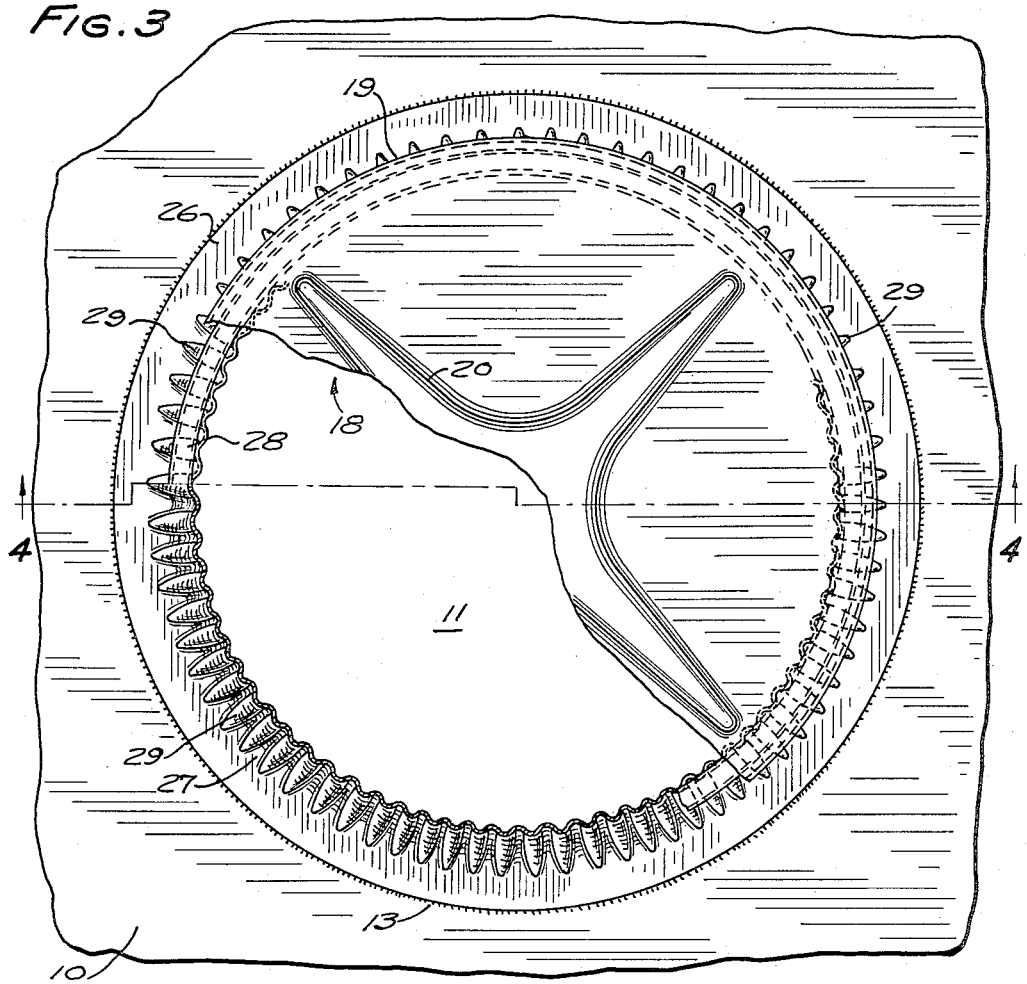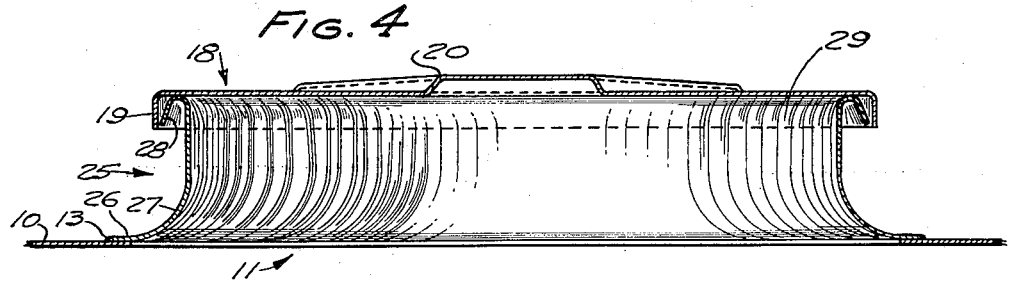

2,840,010
HATCH FRAME ARRANGEMENT

Thor R. Roen, Butler, Pa., assignor to Pullman-Standard Car Manufacturing Company, Chicago, Ill., a corporation of Delaware Application November 16, 1955, Serial No. 547,101

3 Claims. (Cl. 105—377)

This invention relates to a hatch frame arrangement for freight vehicles and more particularly to a round hatch frame for the roofs of such vehicles.

The invention has for its primary purpose the provision of a strong and serviceable hatch frame constructed in such manner that the portion cut from the vehicle roof to make the opening about which the hatch frame is mounted can be made into a cover for the hatch.

In the drawings:

Fig. 1 is a vertical sectional view of a freight vehicle roof embodying the hatch frame construction and arrangement of this invention;

Fig. 2 is a vertical sectional view of a hatch frame arrangement of modified form;

Fig. 3 is a plan view of another modified form of hatch frame construction wherein the frame is corrugated; and Fig. 4 is a vertical sectional view taken on the line 4—4 of Fig. 3.

With reference particularly to Fig. 1 of the drawings, a metallic roof 10 for a freight vehicle is disclosed wherein a circular portion has been removed from the roof to form a hatch opening 11. A hatch frame 12 is disposed in the opening 11 and secured to the roof sheet by welding, as indicated at 13. The hatch frame 12 comprises a vertically disposed major diameter base portion 14 extending around the frame and disposed partially through the opening 11, a sloping intermediate portion 15 extending upwardly and inwardly from the base portion at approximately 45 degrees, with a vertically disposed upper portion 16 of minor diameter extending from the sloping portion 15 and a rebent flange 17 flared outwardly and depending from the top of the upper portion 16 (Fig. 1), the portion 16 and the flange 17 with the curved connecting portion therebetween forming the top edge of the frame 12 and which is of less diameter than that of the base 14. The hatch frame 12 is shown as an integral unit but it may be formed in sections if desired.

By making the bottom portion 14 of the hatch frame of greater diameter than that of the top portion 16 and the outstanding flange 17, the circular portion 18 removed from the roof sheet 10 may be used as a blank from which the cover for the hatch frame may be fabricated. The outer edge 19 of the cover is turned down for weathersealing purposes about the hatch frame without removal of any of the material of the blank except such as may be lost by such superficial grinding as may be desirable to eliminate sharp edges resulting from the cutting operation by which the blank was removed from the roof sheet, and a cruciform embossment 20 is formed in the cover for rigidifying the structure and which radiates outwardly to provide a stiffening and pressure-distributing point of engagement for a hinge strap overlying the cover, thereby to transfer applied pressure outwardly to the rim of the hatch and obtain an effective seal entirely around the hatch by the even distribution of pressure from the single point of application through the embossment to the rim. Thus it will be seen that instead of scrapping the metal comprising the roof sheet cutouts, they are utilized in their entireties in forming the hatch covers, thereby providing an economically improved hatch arrangement. The flared type hatch frame also permits easier access for workmen into and out of the freight vehicle and for the loading and unloading of bulk materials.

A modification of the hatch arrangement of this invention is disclosed in Fig. 2 wherein a hatch frame 21 is provided with a lower outstanding flange 22 supported upon and secured by welding to the roof sheet 10 about the opening 11. An intermediate portion 23 of the hatch frame tapers upwardly and inwardly from the lower flange 22, and at the top of the hatch an outwardly flaring depending flange 24 is connected with the portion 23 by a return bend top portion which forms the top edge of the hatch frame. The hatch cover 18 is supported on the curved top edge of the frame 21.

With particular reference to Figs. 3 and 4, another modification of the invention is shown wherein the hatch frame 25 has a lower radially projecting flange 26 resting upon and secured to the edge of the roof sheet 10 adjacent the opening 11 by welding. An intermediate portion 27 is connected with the flange 26 by a curved portion of relatively large radius and extends upwardly and inwardly from the lower flange of the hatch frame and then substantially vertical to the top of the hatch where an outwardly flaring rebent flange 28 forms the top edge of the hatch frame 25. The hatch frame is provided with a series of vertically extending corrugations 29 formed in the upstanding intermediate portion 27 entirely about the hatch frame for stiffening the frame. The cutout portion 18 removed from the roof sheet 10 to provide a hatch opening is used to form the cover for the hatch frame. The novel construction of the hatch frame, wherein the outermost portion of the top edge 19 is above the hatch opening in the roof sheet, permits of the blank 18 being used to form the hatch cover. The cover 18 may be held down and locked in closed position by means of a hinge strap (not shown) overlying the cruciform embossment 20.

As shown in Figs. 1 and 4, which are diametrical sections through the opening 11 in the roof 10, the hatch frame and the cover, the diameter of the opening is equal to the diameter of the cover plus the width of the two edge flanges 19 thereof, which is the result of using the entirety of the disk cut out from the roof to form the cover.

It will be seen that a strong and serviceable hatch frame has been provided and wherein, due to the novel structure of the frame, the portion of the roof sheet removed to provide the hatch opening may be used as a blank from which to fabricate the cover for the hatch frame.

What is claimed is:

1. In a freight vehicle, a sheet metal roof, a substantially circular portion of said roof being cut therefrom, thereby providing a hatch opening in the roof and a cut out disk portion having a circular edge of the same diameter as said opening, and a hatch frame having a substantially circular bottom portion of relatively large diameter secured to the roof around the opening, an upstanding intermediate portion and an upper substantially circular portion of relatively small diameter terminating in a flange, said cut out disk portion of the roof having its peripheral margin downturned to form a flange terminating in said circular edge and being of slightly larger diameter than the flange of the hatch frame, and said cut out disk portion of the roof being fitted on said frame with its flange engaged over the frame flange.

2. The combination claimed in claim 1 in which the bottom portion of the hatch frame is engaged directly with and welded to the margin of the roof around the opening therein.

3. The combination claimed in claim 1 in which the lower margin of the bottom portion of the hatch frame comprises a substantially vertical extended portion penetrating the opening in the roof and being welded thereto.

References Cited in the file of this patent

UNITED STATES PATENTS

| | | |
|---|---|---|
| 1,422,139 | Sandman | July 11, 1922 |
| 1,487,518 | Nichols et al. | Mar. 18, 1924 |
| 1,664,116 | Kortenhoeven | Mar. 27, 1928 |
| 1,800,396 | Mohun | Apr. 14, 1931 |
| 1,956,665 | Cahall | May 1, 1934 |
| 2,100,119 | Stone | Nov. 23, 1937 |
| 2,142,431 | Wilkoff et al. | Jan. 3, 1939 |
| 2,184,656 | Stone | Dec. 26, 1939 |
| 2,204,164 | Steuber | June 11, 1940 |
| 2,256,334 | Zeidler | Sept. 16, 1941 |
| 2,309,237 | Campbell | Jan. 26, 1943 |
| 2,360,533 | Zeidler | Oct. 17, 1944 |
| 2,487,993 | Tipton | Nov. 15, 1949 |
| 2,734,656 | Schonfeld | Feb. 14, 1956 |

FOREIGN PATENTS

| | | |
|---|---|---|
| 663,978 | Germany | Aug. 18, 1938 |